US011236011B2

(12) United States Patent
Beall et al.

(10) Patent No.: US 11,236,011 B2
(45) Date of Patent: Feb. 1, 2022

(54) TRANSPARENT GLASS-CERAMIC ARTICLES, GLASS-CERAMIC PRECURSOR GLASSES AND METHODS FOR FORMING THE SAME (71) Applicant: CORNING INCORPORATED, Corning, NY (US)

(72) Inventors: George Halsey Beall, Big Flats, NY (US); Charlene Marie Smith, Corning, NY (US); Steven Alvin Tietje, Lindley, NY (US)

(73) Assignee: CORNING INCORPORATED, Corning, NY (US)

( * ) Notice: Subject to any disclaimer, the term of this patent is extended or adjusted under 35 U.S.C. 154(b) by 11 days.

(21) Appl. No.: 16/832,746

(22) Filed: Mar. 27, 2020

(65) Prior Publication Data

US 2020/0223744 A1 Jul. 16, 2020

Related U.S. Application Data (62) Division of application No. 15/794,752, filed on Oct. 26, 2017, now Pat. No. 10,611,675, which is a division of application No. 15/142,654, filed on Apr. 29, 2016, now Pat. No. 9,828,282, which is a division of application No. 14/707,127, filed on May 8, 2015, now Pat. No. 9,359,243.

(60) Provisional application No. 62/003,636, filed on May 28, 2014, provisional application No. 61/992,490, filed on May 13, 2014.

(51) Int. Cl.
*C03B 32/02* (2006.01)
*C03C 10/10* (2006.01)
*C03C 10/00* (2006.01)
*C03C 4/18* (2006.01)
*C03C 21/00* (2006.01)
*C03C 3/064* (2006.01)
*C03C 3/097* (2006.01)
*C03C 3/062* (2006.01)

(52) U.S. Cl.
CPC .......... *C03C 10/0018* (2013.01); *C03B 32/02* (2013.01); *C03C 3/062* (2013.01); *C03C 3/064* (2013.01); *C03C 3/097* (2013.01); *C03C 4/18* (2013.01); *C03C 21/00* (2013.01); *C03C 21/002* (2013.01); *C03C 2204/00* (2013.01)

(58) Field of Classification Search
CPC ................................................. C03C 10/0018
See application file for complete search history.

(56) References Cited

U.S. PATENT DOCUMENTS

| | | |
|---|---|---|
| 3,357,876 A | 12/1967 | Dale |
| 3,573,072 A | 3/1971 | Karstetter et al. |
| 3,573,073 A | 3/1971 | Duke et al. |
| 4,000,998 A | 1/1977 | Rittler |
| 4,022,627 A * | 5/1977 | Tashiro ..................... C03C 8/10 501/6 |
| 4,053,679 A | 10/1977 | Rinehart |
| 4,310,595 A | 1/1982 | Beall et al. |
| 4,341,544 A | 7/1982 | Beall et al. |
| 6,086,977 A | 7/2000 | Suzuki et al. |
| 6,531,420 B1 | 3/2003 | Beall et al. |
| 6,998,177 B2 | 2/2006 | Krzyzak et al. |
| 7,407,604 B2 | 8/2008 | Kear et al. |
| 8,003,217 B2 | 8/2011 | Rosenflanz |
| 8,409,716 B2 | 4/2013 | Schultz et al. |
| 8,759,238 B2 * | 6/2014 | Chapman .............. C03C 21/002 501/63 |
| 8,765,262 B2 | 7/2014 | Gross |
| 8,854,623 B2 | 10/2014 | Fontaine et al. |
| 8,889,575 B2 * | 11/2014 | Boek ..................... C03C 21/001 501/55 |
| 9,115,023 B2 | 8/2015 | Beall et al. |
| 9,346,703 B2 * | 5/2016 | Bookbinder ............ C03C 3/097 |
| 9,359,243 B2 | 6/2016 | Beall et al. |
| 9,718,725 B2 * | 8/2017 | Ellison ...................... C03C 4/02 |
| 9,969,644 B2 | 5/2018 | Gross et al. |
| 10,150,694 B2 * | 12/2018 | Ellison ..................... C03C 3/085 |
| 2004/0116268 A1 * | 6/2004 | Kobayashi .......... C03C 10/0018 501/6 |
| 2011/0294648 A1 | 12/2011 | Chapman et al. |
| 2012/0135226 A1 | 5/2012 | Bookbinder et al. |
| 2012/0181020 A1 | 7/2012 | Barron et al. |

(Continued)

FOREIGN PATENT DOCUMENTS

| | | |
|---|---|---|
| CN | 1313254 A | 9/2001 |
| CN | 102690059 A | 9/2012 |

(Continued)

OTHER PUBLICATIONS

European Patent Application No. 20169910.5 Office Action dated Aug. 7, 2020; 8 Pages; European Patent Office.
Japanese Patent Application No. 2016567086; Machine Translation of the Office Action dated Sep. 2, 2020; Japan Patent Office; 2 Pgs.
Duke, DA, MacDowell, JF and Karstetter, BR, Crystallization and Chemical Strengthening of Nepheline Glass-Ceramics, Am. Ceram. Soc., 50 (2), pp. 67-74, 1967.
G. H. Beall and D. A. Duke in "Transparent Glass-Ceramics", Journal of Materials Science, 4, pp. 340-352 (1969).

(Continued)

*Primary Examiner* — Karl E Group
(74) *Attorney, Agent, or Firm* — Kevin M. Johnson (57) ABSTRACT

Embodiments of glass ceramic articles and precursor glasses are disclosed. In one or more embodiments, the glass-ceramic articles are transparent and include a nepheline phase and a phosphate phase. The glass-ceramic articles are colorless and exhibit a transmittance of about 70% or greater across the visible spectrum. The glass-ceramic articles may optionally include a lithium aluminosilicate phase. The crystals of the glass-ceramic articles may have a major cross-section of about 100 nm or less.

13 Claims, 6 Drawing Sheets

(56) References Cited

U.S. PATENT DOCUMENTS

| | | | |
|---|---|---|---|
| 2012/0212826 A1 | 8/2012 | Henn et al. | |
| 2012/0308827 A1 | 12/2012 | Boek et al. | |
| 2013/0115422 A1 | 5/2013 | Murata | |
| 2013/0122313 A1 | 5/2013 | Gross | |
| 2013/0288001 A1 | 10/2013 | Murata et al. | |
| 2016/0236969 A1* | 8/2016 | Ellison | C03B 32/02 |

FOREIGN PATENT DOCUMENTS

| | | | | |
|---|---|---|---|---|
| CN | 102971267 | A | 3/2013 | |
| CN | 103282318 | A | 9/2013 | |
| DE | 3306648 | A1 | 9/1983 | |
| EP | 885856 | A2 | 12/1998 | |
| JP | 59223249 | A | 12/1984 | |
| JP | 2011057504 | A | 3/2011 | |
| JP | 2012020894 | A | 2/2012 | |
| JP | 2012148909 | A | 8/2012 | |
| JP | 2013-533838 | A | 8/2013 | |
| JP | 2013245151 | A * | 12/2013 | |
| KR | 895911 | B1 | 5/2009 | |
| TW | 201210973 | A | 3/2012 | |
| TW | 201233653 | A | 8/2012 | |
| WO | 2003011784 | A1 | 2/2003 | |
| WO | 2012126394 | A1 | 9/2012 | |
| WO | WO-2012126394 | A1 * | 9/2012 | C03C 10/0054 |
| WO | 2012/166421 | A2 | 12/2012 | |
| WO | 2013164116 | A1 | 11/2013 | |
| WO | 2014035791 | A2 | 3/2014 | |

OTHER PUBLICATIONS

Gomes de Borba, CD, and Riella, H, Acquisition and Characterization of Nepheline Glass-ceramic, Revista de Cienda & Tecnologia, 15, pp. 67-74, Jun. 2000.

Hirose, M, Kobayashi, T and Maeda, K, Transparency and Mechanical Properties of Glass-Ceramics Including Nepheline- Kalsilite Solid Solution, Reports Res. Lab. Asahi Glass Co.. Ltd., 55, pp. 1-7, 2005.

Holand W et al. "Mechanisms of nucleation and controlled crystallization of needle-like apatite etc." Journal of Non-Crystalline Solids 253 (1999) pp. 170-177.

International Search Report and Written Opinion of the International Searching Authority; PCT/SU2015030465; dated August 24, 2015.

Liu et al. "Nucleation and growth of needle-like fluropatite crystals in bioactive glass-ceramics" Journal of Non-Crystalline Solids 354 (2008) pp. 938-944.

Umezu, "Glass ceramics" , Hybrids 4(1) 1988, Japan, pp. 39-44. https://doi.org/10.5104/jiep1985.4.39.

TW104114926 Search Report dated Oct. 2, 2018, 1 Page; Taiwan Patent Office.

English Translation of JP2016567086 Office Action dated May 29, 2019, Japan Patent Office, 7 Pgs.

CN201580038109.7 First Office Action dated Nov. 14, 2018, China Patent Office.

Chinese Patent Application No. 201910476792.2, Office Action dated May 28, 2021, 15 pages (5 pages of English Translation and 10 pages of Original Document), Chinese Patent Office.

* cited by examiner

TRANSPARENT GLASS-CERAMIC ARTICLES, GLASS-CERAMIC PRECURSOR GLASSES AND METHODS FOR FORMING THE SAME

CROSS-REFERENCE TO RELATED APPLICATIONS

This application is a divisional of U.S. application Ser. No. 15/794,752 filed on Oct. 26, 2017, now U.S. Pat. No. 10,611,675, which is a divisional of U.S. application Ser. No. 15/142,654, filed Apr. 29, 2016, now U.S. Pat. No. 9,828,282, which is a divisional of U.S. application Ser. No. 14/707,127, filed on May 8, 2015, now U.S. Pat. No. 9,359,243, which claims the benefit of priority under 35 U.S.C. § 119 of U.S. Provisional Application Ser. No. 62/003,636 filed on May 28, 2014, and U.S. Provisional Application Ser. No. 61/992,490 filed on May 13, 2014, the contents of which are relied upon and incorporated herein by reference in their entirety.

BACKGROUND

The disclosure relates to transparent glass-ceramic articles with improved mechanical strength, and precursor glasses and methods used to form such glass-ceramic articles, and more particularly to transparent glass-ceramic articles that include a nepheline crystalline phase and a transmittance of about 70% or greater, along the visible spectrum.

Sodium aluminosilicate glasses can be strengthened by ion exchange processes in which sodium cations present in the glasses are exchange for larger, potassium cations. Opaque nepheline-containing glass-ceramics can also be strengthened in the same manner.

Nepheline-containing glass-ceramics are typically nucleated by using a $TiO_2$ nucleating agent. A significant amount of $TiO_2$ nucleating agent is typically required to produce internal nucleation in nepheline-containing glass-ceramics (e.g., from about 5-10 wt %), which is an amount sufficient to cause a yellow or amber color in the parent glass (from which the glass-ceramic article is formed).

Accordingly, there is a need for transparent, colorless nepheline-containing glass-ceramic articles that exhibit improved mechanical strength and can be strengthened by known ion exchange methods.

SUMMARY

A first aspect of this disclosure pertains to transparent and highly crystalline nanophase glass-ceramic articles that exhibit improved mechanical strength. In one or more embodiments, the glass-ceramic articles exhibit such improved mechanical strength by exhibiting a high surface compressive stress that may be achieved or generated by exchanging potassium cations for sodium cations present in the glass-ceramic articles. In one or more embodiments, the glass-ceramic articles include a principal or major phase including nepheline. The nepheline phase may include a solid solution. In some embodiments, the glass-ceramic articles include a phosphate phase, which may be present as a minor phase (in comparison to the nepheline phase) and an optional lithium aluminosilicate ("LAS") phase, which may be present as a minor phase (in comparison to the nepheline phase).

In some embodiments, at least one of the nepheline phase and the phosphate phase includes a plurality of nanocrystals having a major cross-sectional dimension of about 100 nm or less. In some instances, a plurality of nanocrystals form at least one of the nepheline phase, the phosphate phase and the lithium aluminosilicate phase, and such plurality of nanocrystals have a major cross-sectional dimension of about 100 nm or less. In some embodiments, the plurality of nanocrystals having a major cross-sectional dimension of about 100 nm or less form all three of the nepheline phase, the phosphate phase and the lithium aluminosilicate phase, when present in the glass-ceramic articles.

In one or more embodiments, the glass-ceramic article is colorless and exhibits a transmittance of about 70% or greater across the visible spectrum, in the range from about 390 nm to about 700 nm.

In one or more embodiments, the glass-ceramic article includes a composition, in mol %, including: $SiO_2$ in the range from about 35 to about 60, $Al_2O_3$ in the range from about 10 to about 30, $Na_2O$ in the range from about 7 to about 31, $K_2O$ in the range from about 0 to about 20, $Li_2O$ in the range from about 0 to about 20, $P_2O_5$ in the range from about 1.5 to about 8, and a rare earth oxide in the range from about 0 to about 6. In some specific embodiments, the composition may include: $SiO_2$ in the range from about 40 to about 55, $Al_2O_3$ in the range from about 14 to about 21, $Na_2O$ in the range from about 13 to about 29, $K_2O$ in the range from about 2 to about 14, $Li_2O$ in the range from about 0 to about 10, $P_2O_5$ in the range from about 2.5 to about 5, and at least one of $ZrO_2$, $Y_2O_3$ and $La_2O_3$ in an amount in the range from about 0 to about 4.

In some embodiments, the composition of the glass-ceramic article can optionally include at least one oxide in an amount in the range from 0 mol % to about 8 mol %. Exemplary oxides include $B_2O_3$, MgO, CaO, SrO, BaO, and $ZrO_2$. The composition of the glass-ceramic article (and the precursor glass used to form the glass-ceramic article) may include less than about 1 mol % $TiO_2$.

The glass-ceramic of one or more embodiments may include a kalsilite phase. In some embodiments, the glass-ceramic article may include a compressive stress layer, the compressive stress layer that optionally includes kalsilite. This kalsilite phase may be generated by an ion exchange process, by which the compressive stress layer is formed. In some embodiments, the glass-ceramic article may have an average surface compressive stress of about 400 MPa or greater (e.g., in the range from about 400 MPa to about 2 GPa).

A second aspect of the present disclosure pertains to a method for forming a glass ceramic article. The method of one or more embodiments includes heat treating a precursor glass article by heating the precursor glass article at a rate in the range from about 1° C./minute to about 10° C./minute to produce a glass-ceramic article having a nepheline phase and cooling the glass-ceramic article to about room temperature. In one or more embodiments, heating the precursor-glass may include a single heating step to a temperature in the range from about 600° to about 1000° C. or from about 725° C. to about 900° C. In some instances, heating the precursor glass may include more than one heat treatment. For example, in some embodiments, heating the precursor glass may include any one or more of the following: a) heating the precursor glass, which may be nucleated, at a rate in the range from about 1° C./minute to about 10° C./minute to a crystallization temperature (Tc) in the range from about 600° to about 900° C. (or more specifically from about 700° C. to about 850° C.), and b) maintaining the precursor glass, which may be nucleated, article at the Tc. At Tc of greater than about 900° C., the resulting glass-ceramic may be translucent or opaque. Optionally, prior to heating the precursor glass to Tc, the method may include heating the precursor glass to a temperature (Tn) in the range from about 700° C. to about 900° C., and maintaining the precursor glass article at the Tn to produce a nucleated precursor glass article. In some embodiments, maintaining the precursor glass article to the Tn to produce a nucleated precursor glass article may be omitted.

In one or more embodiments, the method includes ion exchanging the glass-ceramic article to generate a compressive stress layer comprising a compressive stress of at least 400 MPa. In some embodiments, the method includes ion exchanging the glass-ceramic article to generate a kalsilite surface layer. In some embodiments, the method includes ion exchanging the glass-ceramic by exposing the glass-ceramic article to a molten salt bath having a temperature of less than about 400° C. In some other embodiments, the method includes ion exchanging the glass-ceramic by comprises exposing the glass-ceramic article to a molten salt bath having a temperature of about 400° C. or greater. In such embodiments in which a higher temperature molten salt bath is utilized, the resulting glass-ceramic article has a transmittance of about 70% or greater, across the visible spectrum, and includes a surface compressive stress of about 900 MPa or greater.

The precursor glass article may be a glass sheet, though other shapes are contemplated. In one or more embodiments, the glass sheet may be formed by a rolling process in which the glass sheet has a thickness of about less than 5 mm. The glass sheet may be formed by other methods like float processes, spinning processes or even pressing processes (e.g., for relatively small pieces with a sufficient thickness).

Another aspect of this disclosure pertains to a precursor glass comprising a composition, in mol %, comprising: $SiO_2$ in the range from about 35 to about 60, $Al_2O_3$ in the range from about 10 to about 30, $Na_2O$ in the range from about 7 to about 31, $K_2O$ in the range from about 0 to about 20, $Li_2O$ in the range from about 0 to about 20, $P_2O_5$ in the range from about 1.5 to about 8, and a rare earth oxide in the range from about 0 to about 6. The precursor glass may include at least one oxide in an amount in the range from 0 mol % to about 8 mol %, wherein the at least one oxide comprises one of $B_2O_3$, MgO, CaO, SrO, BaO, and $ZrO_2$. In some embodiments, the precursor glass includes a composition, in mol %, including $SiO_2$ in the range from about 40 to about 55, $Al_2O_3$ in the range from about 14 to about 21, $Na_2O$ in the range from about 13 to about 29, $K_2O$ in the range from about 2 to about 14, $Li_2O$ in the range from about 0 to about 10, $P_2O_5$ in the range from about 2.5 to about 5, and at least one of $ZrO_2$, $Y_2O_3$ and $La_2O_3$ in an amount in the range from about 0 to about 4. In some embodiments, the precursor glass composition includes less than about 1 mol % $TiO_2$.

The precursor glass may include a compressive stress layer having a surface compressive stress in the range from about 200 MPa to about 1000 MPa and a depth of layer in the range from about 50 µm to about 150 µm.

Another aspect of this disclosure pertains to forming a glass article. In one or more embodiments, the method includes providing a glass composition as described herein, forming a glass article from the composition, and ion exchanging the glass article to generate a compressive stress layer comprising a compressive stress of at least 200 MPa and a depth of layer in the range from about 50 µm to about 150 µm.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Reference will now be made in detail to various embodiments, examples of which are illustrated in the accompanying drawings.

A first aspect of this disclosure pertains to glass-ceramic articles and the precursor glasses used to form such articles. In one or more embodiments, the glass-ceramic article is transparent and exhibits superior mechanical strength. The glass-ceramic article of one or more embodiments includes one or more crystalline phases such as a nepheline phase and a phosphate crystalline phase. In some embodiments, the nepheline phase is the primary or major phase, while the phosphate crystalline phase comprises a minor phase. There may be more than one minor phase present in some embodiments. For example, the glass-ceramic articles may include a minor phase of LAS.

In one or more embodiments, the nepheline phase may be present as a solid solution (ss), and may optionally have a hexagonal structure. Exemplary compositions of the nepheline phase include $NaAlSiO_4$, $NaAlSiO_4$—$SiO_2$ solid solution, (Na,K)AlSiO$_4$ solid solution, and/or (Na,K)AlSiO$_4$—$SiO_2$) solid solution, where Na predominates over K. In some instances, the nepheline solid solution minerals are hexagonal (P6$_3$) tectosilicates whose structures are "stuffed" derivatives of the β-tridymite form of silica. The general formula of such hexagonal (P6$_3$) tectosilicates is R(Al,Si,B)O$_4$, where R=Na,K,Ca or a vacancy. The formula may be given in terms of solid solution end members: Ne$_x$Ks$_y$An$_z$Q$_{1-x-y-z}$, where Ne=NaAlSiO$_4$ (soda nepheline), Ks=KAlSiO$_4$ (kalsilite), An=CaAl$_2$Si$_2$O$_8$ (anorthite) and Q=SiO$_2$ (quartz). In some embodiments, some CaO may be present. In one or more specific embodiments, the nepheline compositions may include (K,Na)SiO$_4$, as a primary component in some instances, with some excess SiO$_2$.

In one or more embodiments, the glass-ceramic articles include a phosphate crystal phase, which may form a minor phase, in relation to the nepheline phase. In some instances, the phosphate crystals may be formed at lower temperatures than the nepheline crystals. In some embodiments, the phosphate crystals may nucleate the crystallization of nepheline on a fine scale (e.g., a scale of about tens of nanometers). These phosphate nucleant crystals, which may be preceded during heat treatment by an amorphous phase separation, have been found by x-ray diffraction to include orthophosphates. Exemplary orthophosphates include Na$_3$PO$_4$, or (Na,K)$_3$PO$_4$, NaBaPO$_4$, NaCaPO$_4$ (rhenanite), Li$_3$PO$_4$ (lithiophephete), YPO$_4$ (xenotime), LaPO$_4$ (monazite), RE(PO$_4$), NaMgPO$_4$, NaSrPO$_4$, NaBaPO$_4$, and combinations thereof. In embodiments in which the precursor glass used to form the glass-ceramic articles includes Li$_2$O (either in addition to or instead of Na$_2$O), lithiophosphate (Li$_3$PO$_4$) may be present. In other embodiments, when Y$_2$O$_3$, La$_2$O$_3$ and/or RE$_2$O$_3$ (RE=rare earths) are included in the precursor glass used to form the glass-ceramic articles, orthophosphates of these elements are present in the resulting glass-ceramic articles. In some embodiments, the nucleation of the nepheline phase by these orthophosphates results in the formation of crystals having a major dimension in the range from about 25 nm to about 35 nm, which enhances the transparency of the glass-ceramic articles. In some instances, the transparency of the resulting glass-ceramic article may be such that the glass-ceramic article is indistinguishable by the naked eye, from the precursor glass used to form the glass-ceramic articles.

The crystalline phases of the glass-ceramic articles may be formed using P$_2$O$_5$ as a nucleating agent. In some embodiments, the P$_2$O$_5$ is added or included in a precursor glass in an amount at or near the nepheline ss stoichiometries as listed above. As will be described in greater detail herein, heat treating such precursor glasses can yield clear, colorless and highly crystalline transparent glass-ceramic articles with the nepheline and phosphate crystal phases described herein. As used herein, the term "colorless" means transmission or reflection color coordinates under the CIE L*, a*, b* colorimetry system in the following ranges: L* in the range from about 80 to about 100 (e.g., from about 85 to 100, from about 90 to 100, or from about 95 to 100), a* in the range from about −5 to about 5 (e.g., from about −3 to 3, from about −2 to 2, or from about −1 to 1), and b* in the range from about b* in the range from about −5 to about 5 (e.g., from about −3 to 3, from about −2 to 2, or from about −1 to 1).

In one or more embodiments, the glass-ceramic articles may include a minor phase of kalsilite, which may be formed upon heat treating. The inclusion of a minor kalsilite crystal phase does not alter the transparency of the resulting glass-ceramic. As will be discussed in greater detail below, the presence of kalsilite may improve the mechanical strength (e.g., in terms of surface compressive stress) of the glass-ceramic articles.

In one or more embodiments, the relative amounts of the crystalline phases described herein can be modified to provide desirable properties. For example, as nepheline typically has a high coefficient of thermal expansion (e.g., greater than about 10×10$^{-6}$K$^{-1}$). The addition of a LAS phase having a lower coefficient of thermal expansion, accompanying the nepheline and orthophosphate phases may be useful in increasing thermal shock resistance of the glass-ceramic articles. An example of an LAS phase includes gamma (γ) eucryptite.

In one or more embodiments, the glass-ceramic articles exhibit a high transmittance and low reflectance, even at thicknesses up to about 10 mm (e.g., 0.1 mm to about 10 mm, 0.3 mm to about 10 mm, 0.4 mm to about 10 mm, 0.5 mm to about 10 mm, or 1 mm to about 10 mm). As used herein, the term "transmittance" is defined as the percentage of incident optical power within a given wavelength range transmitted through a material (e.g., the glass-ceramic article, or the precursor glasses). The term "reflectance" is similarly defined as the percentage of incident optical power within a given wavelength range that is reflected from a material (e.g., the article, the substrate, or the optical film or portions thereof). Transmittance and reflectance are measured using a specific linewidth. In one or more embodiments, the spectral resolution of the characterization of the transmittance and reflectance is less than 5 nm or 0.02 eV. The transmittance and/or reflectance values provided herein are across the visible spectrum. As used herein, the visible spectrum includes wavelengths in the range from about 390 nm to about 700 nm.

The glass-ceramic articles of one or more embodiments may exhibit a transmittance in the range from about 50% to about 93%. In some embodiments, the transmittance may be in the range from about 55% to about 93%, from about 60% to about 93%, from about 65% to about 93%, from about 70% to about 93%, from about 75% to about 93%, from about 85% to about 93%, from about 90% to about 93%, from about 50% to about 90%, from about 50% to about 85%, from about 50% to about 80%, from about 50% to about 75%, from about 50% to about 70%, from about 90% to about 93%, or from about 90% to about 92%, and all ranges and sub-ranges therebetween.

In one or more embodiments, the glass-ceramic articles may exhibit a reflectance of about 10% or less as measured on both surfaces. In some instances, the reflectance may be about 9% or less, about 8% or less, or about 7% or less.

The glass-ceramic articles of one or more embodiments may exhibit a low haze and/or transmission haze. In some instances, "haze" and "transmission haze" refer to the percentage of transmitted light scattered outside an angular cone of ±4.0° in accordance with ASTM procedure D1003, the contents of which are incorporated herein by reference in their entirety as if fully set forth below. In one or more embodiments, the glass-ceramic articles may have a haze of about 5% or less, or more specifically, about 1% or less.

The sizes of the crystals in the glass-ceramic articles are tailored to provide the improved mechanical strength and/or optical performance (e.g., transparency). In one or more embodiments, the crystalline phases may be described as nanophase such that the crystals in the crystalline phases have a major dimension of about 100 nm or less. In some instances, the crystals have a major dimension of about 90 nm or less, about 80 nm or less, about 70 nm or less, about 60 nm or less, about 50 nm or less, about 40 nm or less, about 30 nm or less, or about 20 nm or less. In some embodiments, about 50% or more of the crystals in any one or more of the crystalline phases (e.g., nepheline phase, phosphate crystal phase, and/or LAS phase) have the major dimensions described herein. For example, about 50%, 60%, 70%, 80%, 90%, 95% or 100% of the crystals in any one or more of the crystalline phases have a major dimension of about 100 nm or less. In some instances about 95% or 100% of the crystals of any one or more crystalline phases have a major dimension of about 50 nm or less. For example, all the crystals in a glass-ceramic article may have major dimensions of 100 nm or less. In some embodiments, the crystal sizes of the one or more crystalline phases may be modified, while taking into consideration the desired refractive index of a glass-ceramic article. For example, the foregoing crystal sizes may be suitable to provide high transparency and low light scattering, where the resulting glass-ceramic article has a refractive index in the range from about 1.3 to about 1.7.

In some embodiments, the glass-ceramic articles may be described as highly crystalline. In such embodiments, the crystalline phase(s) may include about 50% by weight or greater of the glass-ceramic article. In some instances, the crystalline phase(s) may include about 50 wt % to about 100 wt % of a glass-ceramic article. In some embodiments, the crystalline phase(s) may include about 60 wt % to about 100 wt %, about 70 wt % to about 100 wt %, about 80 wt % to about 100 wt %, or about 85 wt % to about 90 wt %, of a glass-ceramic article.

The glass-ceramic articles described herein and the precursor glasses used to form such articles may include a composition, in mol %, including: $SiO_2$ in the range from about 35 to about 60, $Al_2O_3$ in the range from about 10 to about 30, $Na_2O$ in the range from about 7 to about 31, $K_2O$ in the range from about 0 to about 20, $Li_2O$ in the range from about 0 to about 20, $P_2O_5$ in the range from about 1.5 to about 8, and a rare earth oxide in the range from about 0 to about 6. In one or more embodiments, the composition may include one or more oxides such as $B_2O_3$, MgO, CaO, SrO, BaO, and $ZrO_2$, in an amount in the range from 0 mol % to about 8 mol %.

In one or more embodiments, the amount of $SiO_2$ in the compositions of the precursor glasses and/or glass-ceramics articles may be, in mol %, in the range from about 35 to about 60, from about 35 to about 58, from about 35 to about 56, from about 35 to about 55, from about 35 to about 54, from about 35 to about 52, from about 35 to about 50, from about 35 to about 45, from about 36 to about 60, from about 38 to about 60, from about 40 to about 60, from about 42 to about 60, from about 44 to about 60, from about 45 to about 60, from about 40 to about 55, from about 45 to about 55, from about 45 to about 50, from about 50 to about 60, or from about 47 to about 53, and all ranges and sub-ranges therebetween. $SiO_2$ can be the main constituent of the composition and, as such, can constitute a matrix of the glass in the precursor glass and/or the glass-ceramic. Also, $SiO_2$ can serve as a viscosity enhancer for aiding in the formability of a glass, while imparting chemical durability to the glass.

In some embodiments, the amount of $Al_2O_3$ in the compositions of the precursor glasses and/or glass-ceramics may be, in mol %, in the range from about 10 to about 30, from about 12 to about 30, from about 14 to about 30, from about 16 to about 30, from about 18 to about 30, from about 20 to about 30, from about 10 to about 28, from about 10 to about 26, from about 10 to about 25, from about 10 to about 24, from about 10 to about 22, from about 10 to about 20, from about 10 to about 15, from about 14 to about 25, from about 14 to about 21, from about 15 to about 25, or from about 16 to about 24, from about 17 to about 23, or from about 18 to about 22, and all ranges and sub-ranges therebetween.

In some embodiments, $Na_2O$ may be present in the compositions of the precursor glasses and/or glass-ceramics, in mol %, in the range from about 7 to about 31, from about 7 to about 30, from about 7 to about 28, from about 7 to about 26, from about 7 to about 24, from about 7 to about 22, from about 7 to about 20, from about 8 to about 31, from about 10 to about 31, from about 12 to about 31, from about 13 to about 31, from about 13 to about 29, from about 13 to about 25, or from about 13 to about 24, and all ranges and sub-ranges therebetween.

In some embodiments, $K_2O$ may be present in the compositions of the precursor glasses and/or glass-ceramics, in mol %, in the range from about 0 to about 20, from about 0 to about 18, from about 0 to about 16, from about 0 to about 14, from about 0 to about 12, from about 0.1 to about 20, from about 0.1 to about 18, from about 0.1 to about 16, from about 0.1 to about 14, from about 0.1 to about 12, 2 to about 20, from about 4 to about 20, from about 6 to about 20, from about 8 to about 20, from about 10 to about 20, from about 2 to about 18, from about 2 to about 16, from about 2 to about 12, or from about 2 to about 10, and all ranges and sub-ranges therebetween.

In some embodiments, $Li_2O$ may be present in the compositions of the precursor glasses and/or glass-ceramics, in mol %, in the range from about 0 to about 20, from about 0 to about 18, from about 0 to about 16, from about 0 to about 14, from about 0 to about 12, from about 0 to about 10, from about 0.1 to about 20, from about 0.1 to about 18, from about 0.1 to about 16, from about 0.1 to about 14, from about 0.1 to about 12, from about 0.1 to about 10, from about 2 to about 20, from about 4 to about 20, from about 6 to about 20, from about 8 to about 20, from about 10 to about 20, from about 2 to about 18, from about 2 to about 16, from about 2 to about 12, or from about 2 to about 10, and all ranges and sub-ranges therebetween.

In some embodiments, the precursor glasses and/or glass-ceramics may have a composition including, in mol %, one or more rare earth oxides such as $Y_2O_3$ and $La_2O_3$. In one or more embodiments, such oxides are present, in mol %, in the range from about 0 to about 6, from about 0 to about 5, from about 0 to about 4, from about 0 to about 3, from about 0 to about 2, from about 0 to about 1, from about 0.1 to about 6, from about 0.1 to about 5, from about 0.1 to about 4, from about 0.1 to about 3, from about 0.1 to about 2, or from about 0.1 to about 1, and all ranges and sub-ranges therebetween.

In some embodiments, the precursor glasses and/or glass-ceramics may have a composition including one or more oxides selected from any one of $B_2O_3$, MgO, CaO, SrO, BaO, and $ZrO_2$. Any one or more of such oxides may be present, in mol %, in an amount in the range from about 0 to about 8, from about 0 to about 6, from about 0 to about 5, from about 0 to about 4, from about 0 to about 3, from about 0 to about 2, from about 0 to about 1, from about 0.1 to about 8, from about 0.1 to about 6, from about 0.1 to about 5, from about 0.1 to about 4, from about 0.1 to about 3, from about 0.1 to about 2, or from about 0.1 to about 1, and all ranges and sub-ranges therebetween.

The compositions of the precursor glass and/or glass-ceramics may also include one or more nucleating agents. The one or more nucleation agents are incorporated to facilitate nucleation and/or growth of at least crystalline phase and any desired one or more minor crystalline phases during thermal treatment (e.g., nucleation and/or crystallization) of the precursor glasses described herein.

In some embodiments, the one or more nucleating agents may include $P_2O_5$ and/or $ZrO_2$. $P_2O_5$ may be present in the compositions of the precursor glass and/or glass-ceramics in an amount from about 1.5 to about 8, from about 2 to about 8, from about 2.5 to about 8, from about 3 to about 8, from about 3.5 to about 8, from about 1.5 to about 7.5, from about 1.5 to about 7, from about 1.5 to about 6.5, from about 1.5 to about 6, from about 1.5 to about 5.5, from about 1.5 to about 5, from about 2.5 to about 6, from about 2.5 to about 5, or from about 2.2 to about 4, and all ranges and sub-ranges therebetween. $ZrO_2$ can be included in the compositions of the precursor glass and/or glass ceramics in an amount from about 0 to about 6, from about 0 to about 5, from about 0 to about 4, from about 0 to about 3, from about 0 to about 2, from about 0 to about 1, from about 0.1 to about 6, from about 0.1 to about 5, from about 0.1 to about 4, from about 0.1 to about 3, from about 0.1 to about 2, or from about 0.1 to about 1, and all ranges and sub-ranges therebetween.

In one or more embodiments, the compositions of the precursor glasses and/or glass-ceramic articles include about 1 mol % or less of $TiO_2$. In some embodiments, the amount of $TiO_2$ is limited to about 0.5 mol % or less. In some instances, the compositions of the precursor glasses and/or glass-ceramic articles are substantially free of $TiO_2$. As used here, the phrase "substantially free" means that a component is not purposely included in the composition and any amounts present are trace amounts limited to about 0.01 mol % or less.

In some embodiments, Ce, Fe and/or Sn may be included in the composition of the precursor glass and/or glass-ceramic articles as part of a fining package during glass formation. Other fining agents can also be used, such as chlorides and/or sulfates.

The glass-ceramic articles and precursor glasses used to form such articles may include a compressive stress layer extending from the surface of the glass-ceramic article and/or precursor glass to a depth within the glass-ceramic article and/or precursor glass. As will be described in greater detail below, such compressive stress layers may be formed or introduced into the glass-ceramic articles and/or precursor glasses through various processes. One such process includes an ion exchange process by which the precursor glass and/or glass-ceramic articles are immersed or exposed to an ion exchange bath having a specific composition and temperature, for a specified time period, to impart to the one or more surfaces with compressive stress(es) ($\sigma$s). The compressive stresses can include one or more average surface compressive stress (CS), and/or one or more depths of compressive stresses (which may be referred to as one or more depths of layer (DOL)).

The compressive stress ($\sigma_s$) of the surface compressive stress layer, average surface compression (CS) of the glass-ceramics and precursor glasses described herein can be conveniently measured using conventional optical techniques and instrumentation such as commercially available surface stress meter models FSM-30, FSM-60, FSM-6000LE, FSM-7000H . . . etc. available from Luceo Co., Ltd. and/or Orihara Industrial Co., Ltd., both in Tokyo, Japan. In some instances, additional analysis may be required to determine an accurate stress profile. For example, in embodiments in which kalsilite is present, addition analysis may be required. CS, DOL and the stress profile may be measured by refracted near-field (RNF), as more fully described in U.S. Pat. No. 8,854,623.

The precursor glasses and glass-ceramic articles described herein may have the same or overlapping compressive stress profiles (including average surface compressive stress values and/or DOLs). In some other instances, the precursor glasses and glass-ceramic articles may exhibit differing compressive stress profiles.

In one or more embodiments, the precursor glasses (prior to being heat treated) may exhibit an average surface compressive stress of up to about 1200 MPa. In some instances, the average surface compressive stress is in the range from about 200 MPa to about 1200 MPa. In some specific instances, the average surface compressive stress may be in the range from about 200 MPa to about 500 MPa, from about 200 MPa to about 400 MPa, or from about 300 MPa to about 500 MPa, as measured by FSM. The precursor glasses of one or more embodiments (prior to being heat treated) may have a DOL of up to about 150 µm. In some instances, the DOL of the precursor glasses may be in the range from about 50 µm to about 150 µm, from about 60 µm to about 150 µm, from about 70 µm to about 150 µm, from about 80 µm to about 150 µm, from about 90 µm to about 150 µm, from about 70 µm to about 120 µm, from about 70 µm to about 110 µm, from about 70 µm to about 100 µm or from about 70 µm to about 90 µm, as measured by FSM or comparable methods.

In one or more embodiments, the glass-ceramic articles may exhibit an average surface compressive stress of about 200 MPa or greater. In some instances, the average surface compressive stress is in the range from about 200 MPa to about 1600 MPa. In some specific instances, the average surface compressive stress may be in the range from about 400 MPa to about 1600 MPa, from about 600 MPa to about 1600 MPa, from about 700 MPa to about 1600 MPa, from about 800 MPa to about 1600 MPa, from about 900 MPa to about 1600 MPa, from about 200 MPa to about 1400 MPa, from about 400 MPa to about 1400 MPa, from about 600 MPa to about 1400 MPa, from about 700 MPa to about 1400 MPa, from about 800 MPa to about 1400 MPa, from about 900 MPa to about 1400 MPa, as measured by FSM. The glass-ceramic articles of one or more embodiments may have a DOL of up to about 100 µm. In some instances, the DOL of the glass-ceramic articles may be in the range from about 10 µm to about 100 µm, from about 20 µm to about 100 µm, from about 30 µm to about 100 µm, from about 40 µm to about 100 µm, from about 50 µm to about 100 µm or from about 60 µm to about 100 µm, as measured by FSM.

In some instances, the compressive stress in the glass-ceramic articles is a result of the exchange of potassium cations into the glass-ceramic article and in particular into the nepheline crystals, with sodium or a smaller cation exchanging out of the glass-ceramic article. The potassium ions expand the unit cell of the nepheline crystals and increase compression in the surface of the glass-ceramic article.

In some embodiments, phase transformation from nepheline (Na,K)AlSiO_4 to kalsilite (KAlSiO_4) can also occur, yielding even higher surface compression. In one or more embodiments, the glass-ceramic articles may include kalsilite, which may be present in the compressive stress layer, as the sodium cations present in the glass-ceramic articles are exchanged for potassium cations. In one or more embodiments, the presence of kalsilite, generated through the ion exchange process, in the compressive stress layer results in increased surface compressive stress (e.g., surface CS of greater than about 1000 MPa). In some embodiments, the kalsilite is present in a portion of the compressive stress layer (e.g., from the surface of the glass-ceramic article to a depth that is less than the DOL). In some embodiments, the kalsilite is present as a layer at the surface (i.e., it forms a surface layer) of the glass-ceramic article. The glass-ceramic articles described herein can be strengthened by an ion exchange process to higher levels than can be achieved in glasses, because greater surface compression results from a combination of crowding of the larger ion within the nepheline crystal and by ion-exchange-induced phase transformation involving partially or completely converting nepheline to kalsilite. Moreover, the glass-ceramic has a higher strain point than glass, and therefore higher temperature salt baths may be used to speed up the ion exchange process. In addition, the greater fracture toughness of glass-ceramics (in comparison to glass), allows higher surface compression and internal tension to develop before a level of undesired frangibility is reached.

In some embodiments, the precursor glasses and/or glass-ceramics may exhibit abraded ring-on-ring (ROR) values up to about 1000 MPa; however, the glass-ceramic may exhibit abraded ROR values up to 3000 MPa, after abrading with SiC particles at 5 psi. In some embodiments, the abraded ring-on-ring values may be in the range from about 400 MPa to about 1000 MPa, from about 500 MPa to about 1000 MPa, from about 600 MPa to about 1000 MPa, from about 700 MPa to about 1000 MPa or from about 800 MPa to about 1000 MPa.

In some embodiments, the glass-ceramics may exhibit a crystallinity such that (R-3P)/Al is in the range from about 0.5 to about 1.5, from about 0.6 to about 1.1 or from about 0.65 to about 1.1.

In one or more embodiments, the precursor glasses and/or glass-ceramics may have to a thickness up to about 10 mm. In some instances the thickness may be in the range from about 0.1 mm to about 10 mm, from about 0.2 mm to about 10 mm, from about 0.3 mm to about 10 mm, from about 0.5 mm to about 10 mm, form about 0.7 mm to about 10 mm, from about 1 mm to about 10 mm, from about 0.7 mm to about 5 mm, from about 0.7 mm to about 2 mm, or from about 0.7 mm to about 1.3 mm.

The glass-ceramic articles and/or precursor glasses described herein may include a coating which can provide an added functionality. For example, such coatings can include anti-fingerprint coatings, anti-reflective coatings, anti-smudge coatings, easy-to-clean coatings, scratch resistant coatings, and the like. Such coatings may be disposed on a surface of the glass-ceramic article by various methods such as chemical vapor deposition (CVD) (e.g., plasma-enhanced CVD, aerosol-assisted CVD, metal organic CVD, and the like), any of the variants of physical vapor deposition (PVD) (e.g., ion-assisted PVD, pulsed laser deposition, cathodic arc deposition, sputtering, and the like), spray coating, spin-coating, dip-coating, inkjetting, sol-gel processing, or the like. Such processes are known to those skilled in the art to which this disclosure pertains.

Various articles may incorporate or utilize the precursor glasses and/or glass-ceramics described herein. For example, covers and/or housings used in electronic devices might be formed using the precursor glasses and/or glass-ceramics. In still yet other embodiments, the precursor glasses and glass-ceramics might be used in a variety of electronic devices or portable computing devices, which might be configured for wireless communication, such as, computers and computer accessories, such as, "mice", keyboards, monitors (e.g., liquid crystal display (LCD), which might be any of cold cathode fluorescent lights (CCFLs-backlit LCD), light emitting diode (LED-backlit LCD) . . . etc., plasma display panel (PDP) . . . and the like), game controllers, tablets, thumb drives, external drives, whiteboards . . . etc.; personal digital assistants (PDAs); portable navigation device (PNDs); portable inventory devices (PIDs); entertainment devices and/or centers, devices and/or center accessories such as, tuners, media players (e.g., record, cassette, disc, solid-state . . . etc.), cable and/or satellite receivers, keyboards, monitors (e.g., liquid crystal display (LCD), which might be any of cold cathode fluorescent lights (CCFLs-backlit LCD), light emitting diode (LED-backlit LCD) . . . etc, plasma display panel (PDP) . . . and the like), game controllers . . . etc.; electronic reader devices or e-readers; mobile or smart phones . . . etc. As alternative examples, the precursor glasses and glass-ceramics might be used in automotive (consoles, automotive body parts), appliances, and even architectural applications (e.g., sinks, faucets, shower walls, bathtubs, outlet covers, countertops, backsplashes, elevator cabs, etc.), energy production applications (e.g, solar thermal parts).

A second aspect of this disclosure pertains to a method of forming a precursor glass, a glass-ceramic article or both a precursor glass and a glass ceramic.

The method for forming a precursor glass (formulated to be precursor to glass ceramics described herein) includes melting at a temperature below about 1600° C. a mixture of raw materials formulated to produce upon melting a precursor glass. The method may include any one or more of fining and homogenizing the molten mixture of raw materials at a temperature below about 1600° C. to form a precursor glass. The precursor glass may be formed using known methods in the art such as rolling, thin rolling, pressing, casting and float processes. In one or more embodiments, the precursor glass may be shaped into a flat, planar sheet or may be formed into a three-dimensional shape (e.g., by casting into a mold or other known methods).

In one or more embodiments, the method for forming a glass-ceramic includes heat treating the precursor glasses described herein at one or more preselected temperatures for one or more preselected times to induce crystallization (i.e., nucleation and growth) of one or more crystalline phases (e.g., having one or more compositions, amounts, morphologies, sizes or size distributions, etc.). The method includes cooling the formed glass-ceramics to room temperature. In one or more specific embodiments, heat treating the precursor glasses can include heating precursor glasses at a rate of 1-10° C./min to a maximum temperature, in the range from about 600° C. to about 1000° C. (e.g., from about 725° C. to about 900° C. or from about 750° C. to about 900° C.). In some embodiments, heat treating the precursor glasses can include more than one heat treatment. For example, in some embodiments, heat treating the precursor glasses can include any one or more of: (i) heating precursor glasses at a rate of 1-10° C./min to a nucleation temperature (Tn) in the range from about 600° C. to about 750° C.; (ii) maintaining the precursor glasses at the nucleation temperature for a time in the range from between about ¼ hr to about 4 hr to produce nucleated precursor glasses; (iii) heating the precursor glasses, which may be nucleated, at a rate in the range from about 1° C./min to about 10° C./min to a crystallization temperature (Tc) in the range from about 700° C. to about 1000° C.; and (iv) maintaining the precursor glasses, which may be nucleated, at the crystallization temperature for a time in the range from about ¼ hr to about 4 hr to produce the glass-ceramics described herein.

Temperature-temporal profile of heat treatment steps, in addition to precursor glass compositions, are judiciously prescribed so as to produce one or more of the following desired attributes: crystalline phase(s) of the glass-ceramics, proportions of one or more predominate crystalline phases and/or one or more minor crystalline phases and residual glass, crystal phase assemblages of one or more predominate crystalline phases and/or one or more minor crystalline phases and residual glass, and grain sizes or grain size distributions among one or more predominate crystalline phases and/or one or more minor crystalline phases, which in turn may influence the final integrity, quality, color, and/or transparency, of resultant formed glass-ceramics. In some embodiments, the heat treatment related to nucleating the precursor glass (e.g., steps (i) and (ii)) may be omitted and the precursor glass may simply be heat treated at a set temperature (at the rates otherwise disclosed herein) to form the one or more crystalline phases. For example, the precursor glasses may be heated at a rate in the range from about 1° C./min to about 10° C./min, to 725° C., 750° C., 775° C., 800° C., 825° C., 850° C., 875° C. or 900° C. for a set amount of time (e.g., up to about 6 hours, up to about 4 hours, or up to about 2 hours).

The resultant glass-ceramic sheets can then be reformed by pressing, blowing, bending, sagging, vacuum forming, or other means into curved or bent pieces of uniform thickness. Reforming can be done before thermally treating or the forming step can also serve as a thermal treatment step where both forming and thermally treating are performed substantially simultaneously. In some embodiments, the forming might precede the transforming, or the transforming might precede the forming, or the transforming might occur substantially simultaneously with the forming.

In some embodiments, the method for forming a precursor glass and/or a glass ceramic includes forming a compressive stress layer in the precursor glass and/or glass ceramic, as described herein. In one or more embodiments, the method specifically includes ion exchanging the precursor glass and/or glass ceramic article by subjecting one or more surfaces of such precursor glass and/or glass ceramic to one or more ion exchange baths, having a specific composition and temperature, for a specified time period to impart to the one or more surfaces with compressive stress (es) ($\sigma$s). The compressive stresses can include one or more average surface compressive stress (CS), and/or one or more DOLs.

The bath(s) used in the ion exchange process represent an ion source having one or more ions having an ionic radius larger than the ionic radius of one or more ions present in the precursor glass and/or glass ceramic (and, more particularly, the ions present in at least one surface of the precursor glass and/or glass ceramic). During immersion of the precursor glass and/or glass ceramic into the bath, the ions in the precursor glass and/or glass ceramic having smaller radii can replace or be exchanged with ions having larger radii. This exchange may be facilitated or achieved by controlling the bath and/or precursor glass and/or glass ceramic temperature within a range of temperatures at which ion inter-diffusion (e.g., the mobility of the ions from between bath and the glass-ceramic) is sufficiently rapid within a reasonable time (e.g., between about 1 hr. and 64 hrs. or from 4-16 hrs., ranging at between about 300° C. and 500° C. or from 360° C.-460° C.). Also, typically such temperature is below the glass transition temperature (Tg) of any glass of a glass-ceramic. Some exemplary ions that may be exchanged between the bath and the precursor glass and/or glass ceramic include sodium ($Na^+$), lithium ($Li^+$), potassium ($K^+$), rubidium ($Rb^+$), and/or cesium (CO ions. In one scenario, the bath may include sodium ($Na^+$), potassium ($K^+$), rubidium ($Rb^+$), and/or cesium (CO ions, which may be exchanged for lithium ($Li^r$) ions in the precursor glass and/or glass ceramic. Alternatively, ions of potassium ($K^+$), rubidium ($Rb^+$), and/or cesium ($Cs^+$) in the bath can be exchanged for sodium ($Na^+$) ions in the precursor glass and/or glass ceramic. In another scenario, ions of rubidium ($Rb^+$) and/or cesium (CO in the bath may be exchanged for potassium ($K^+$) ions in the precursor glass and/or glass ceramic.

Some examples of ion sources include one or more gaseous ion sources, one or more liquid ion sources, and/or one or more solid ion sources. Among one or more liquid ion sources are liquid and liquid solutions, such as, for example molten salts. For example for the above ion-exchange examples, such molten salts can be one or more alkali metal salts such as, but not limited to, one or more halides, carbonates, chlorates, nitrates, sulfites, sulfates, or combinations of two or more of the proceeding. In one example, suitable alkali metal salts can include potassium nitrate ($KNO_3$), sodium nitrate ($NaNO_3$) and the combination thereof. It should be noted that in addition to single step ion exchange processes, multiple step ion exchange processes can be utilized to provide a specific CS to the surface of the precursor glass and/or glass ceramic and thus, enhance the performance of a precursor glass and/or glass ceramic. In some embodiments, single step ion exchange processes can be accomplished by exchanging ion (particularly lithium-for-sodium ion exchange) into a surface of the precursor glass and/or glass ceramic by placing a precursor glass and/or glass ceramic article in $NaNO_3$ baths at between about 300° C. and 500° C. for between about 1 hr and 64 hr. In other embodiments, single step ion exchange processes can be accomplished by placing a precursor glass and/or glass ceramic article in a mixed potassium/sodium baths at (e.g. a bath including about 0.1 wt % to about 25 wt % $NaNO_3$ with the balance being $KNO_3$, a 80/20 $KNO_3$/$NaNO_3$ bath, a 60/40 $KNO_3$/$NaNO_3$ bath, or even a 50/50 $KNO_3$/$NaNO_3$ bath . . . etc.) at between about 300° C. and 500° C. for between about 1 hr and 64 hr. In still other embodiments, two-step ion exchange process can be accomplished by first placing a precursor glass and/or glass ceramic article in a Li-containing salt bath (e.g. the molten salt bath can be a high temperature sulfate salt bath composed of $Li_2SO_4$ as a major ingredient, but diluted with $Na_2SO_4$, $K_2SO_4$ or $Cs_2SO_4$ in sufficient concentration to create a molten bath) between about 300° C. and 500° C. for between about 1 hr and 64 hr followed by placing the ion exchanged precursor glass and/or glass ceramic in a Na-containing salt bath between about 300° C. and 500° C. for between about 1 hr and 64 hr. The first step of the two step ion exchange process functions to replace the larger sodium ions in at least one surface of the precursor glass and/or glass ceramic with the smaller lithium ions found in the Li-containing salt bath. The second step of the two step ion exchange process functions to exchange Na into at least one surface of the precursor glass and/or glass ceramic.

Alternative bath compositions that can be used to ion exchange the precursor glasses and glass ceramics described herein include $KCl/K_2SO_4$ mixtures, having a temperature of 700° C. or greater. The ratio of $KCl/K_2SO_4$ may be from about 60:40 to about 40:60, or more particularly, from 52:48. Such bath composition can be used to form glass ceramics with kalsilite on the surface, as described herein. These alternative compositions can be combined with $NaNO_3$ or $KNO_3$, which may be used as a poisoning component. The compressive stress profile of such glass ceramics can be modified using these alternative bath compositions. For example, in some embodiments, the glass ceramics ion exchanged with these alternative bath compositions may exhibit a "step" compressive stress profile, as a function of depth of layer, such that the CS is maintained at a high level for a deeper depth from the surface (e.g., about 40 µm or greater), and then tapers off at even deeper depths. This "step" profile is believed to be caused by the presence of a kalsilite layer at the surface. For comparison, most known glasses having a compressive stress profile starts at or near its highest compressive stress level at the surface and tapers off or reduces along the depth, consistently. In other embodiments, the glasses and/or glass ceramics ion exchanged with the alternative bath compositions may exhibit a buried CS peak, such that the CS decreases from the surface but then increases at a depth from the surface, before decreasing again at deeper depths.

In one or more specific embodiments, the method includes generating a kalsilite surface layer in the glass-ceramic article. In some instances, generating the kalsilite layer may include transforming a portion of the nepheline phase to kalsilite. In some embodiments, generating the kalsilite layer includes immersing the glass-ceramic article into an ion exchange bath having a temperature of about 400° C. or greater (e.g., about 450° C.). The ion exchange bath can include $KNO_3$. The resulting glass-ceramic article exhibits a compressive stress of about 900 MPa or greater and also exhibits a transmittance of about 70% or greater across the visible spectrum.

Various embodiments will be further clarified by the following examples.

EXAMPLES

In the examples, identification of the phase assemblages and/or crystalline sizes for the precursor glasses and glass-ceramics described herein was determined or could be determined by XRD analysis techniques known to those in the art, using such commercially available equipment as the model as a PW1830 (Cu Kα radiation) diffractometer manufactured by Philips, Netherlands. Spectra were typically acquired for 20 from 5 to 80 degrees. Elemental profiles measured for characterizing the surfaces of the precursor glasses and/or glass-ceramics described herein were determined or could be determined by analytical techniques know to those in the art, such as, electron microprobe analysis (EMPA), x-ray photoluminescence spectroscopy (XPS), secondary ion mass spectroscopy (SIMS), etc.

Example 1

The following examples illustrate the advantages and features of this disclosure and in are no way intended to limit this disclosure thereto Inasmuch as the sum of the individual constituents totals or very closely approximates 100, for all practical purposes the reported values may be deemed to represent mole %. The actual precursor glass batch ingredients may comprise any materials, either oxides, or other compounds, which, when melted together with the other batch components, will be converted into the desired oxide in the proper proportions.

Examples 1-16

The exemplary precursor glasses listed in Table 1 were made in a platinum crucible using a batch of raw materials formulated to yield 2000 g of precursor glass upon melting and refining. Each crucible containing a formulated raw materials batch was placed in a furnace preheated to a temperature in the range from about 1450° C. to about 1650° C., the formulated raw materials batch melted and refined in this furnace for 16 hours to produce molten precursor glass that was then cast into rectangular slabs that were annealed for about 6 hours at a temperature in the range from about 600° C. to about 700° C. The resulting glass slabs were transparent, colorless and contained no crystals.

In this way, individual slabs of an exemplary precursor glass could then be subject to a number of different and/or similar heat treatments by placing in a static furnace programmed with such different or similar temperature-temporal cycle. Examples of some of the temperature-temporal cycles to which a number of the slabs of the exemplary precursor glasses listed in Table 1 were subjected are shown in Table 2 and include:

- introducing the precursor glass into a furnace set at between room temperature and 500° C.;
- heating the precursor glass at 5° C./minute (min) to a temperature in the range from about 725° C. to about 900° C., as shown in Table 2; and
- cooling to room temperature.

The appearance of the heat treated slabs of precursor glasses following heat treatment are provided in Table 2. The rectangular slabs of precursor glass, after being subjected to heat treatment, exhibited improved transparency as compared to before heat treatment.

Also as determined by X-ray diffraction (XRD) analysis, resultant glass-ceramics exhibited a crystal phase assemblage comprising a nepheline phase as a predominant crystalline phase and one or more minor phases including various combinations of a phosphate crystal phase alone or phosphate crystal phase with LAS phase, as also shown in Table 2.

TABLE 1

| Composition of precursor glasses 1-16. | | | | | | | | |
|---|---|---|---|---|---|---|---|---|
| | 1 | 2 | 3 | 4 | 5 | 6 | 7 | 8 |
| Wt. % | | | | | | | | |
| $SiO_2$ | 38 | 40 | 37.3 | 44.2 | 37.1 | 43.4 | 37.2 | 36.3 |
| $Al_2O_3$ | 27.2 | 24.4 | 26.7 | 23.9 | 26.5 | 23.7 | 26.6 | 26 |
| $Na_2O$ | 18.2 | 15.5 | 20 | 24.1 | 19.4 | 25.1 | 19.7 | 19.2 |
| $Li_2O$ | 0 | 0 | 0 | 0 | 0 | 0 | 0 | 0 |
| $K_2O$ | 7.5 | 8 | 8.2 | 0 | 8 | 0 | 8.1 | 7.9 |
| $P_2O_5$ | 9.1 | 7.1 | 7.8 | 7.8 | 9 | 7.8 | 8.4 | 8.2 |
| $B_2O_3$ | 0 | 0 | 0 | 0 | 0 | 0 | 0 | 2.4 |
| BaO | 0 | 5 | 0 | 0 | 0 | 0 | 0 | 0 |
| $Y_2O_3$ | 0 | 0 | 0 | 0 | 0 | 0 | 0 | 0 |
| $ZrO_2$ | 0 | 0 | 0 | 0 | 0 | 0 | 0 | 0 |
| Total | 100 | 100 | 100 | 100 | 100 | 100 | 100 | 100 |
| Mol % | | | | | | | | |
| $SiO_2$ | 47.3 | 50.3 | 46.1 | 52 | 46.2 | 51.1 | 46.1 | 44.9 |
| $Al_2O_3$ | 19.9 | 18.1 | 19.4 | 16.6 | 19.4 | 16.4 | 19.4 | 19 |
| $Na_2O$ | 22 | 18.9 | 23.9 | 27.5 | 23.4 | 28.6 | 23.7 | 23 |
| $Li_2O$ | 0 | 0 | 0 | 0 | 0 | 0 | 0 | 0 |
| $K_2O$ | 6 | 6.4 | 6.5 | 0 | 6.3 | 0 | 6.4 | 6.2 |
| $P_2O_5$ | 4.8 | 3.8 | 4.1 | 3.9 | 4.7 | 3.9 | 4.4 | 4.3 |
| $b_2o_3$ | 0 | 0 | 0 | 0 | 0 | 0 | 0 | 2.6 |
| BaO | 0 | 2.5 | 0 | 0 | 0 | 0 | 0 | 0 |
| $Y_2O_3$ | 0 | 0 | 0 | 0 | 0 | 0 | 0 | 0 |
| $ZrO_2$ | 0 | 0 | 0 | 0 | 0 | 0 | 0 | 0 |
| Total | 100 | 100 | 100 | 100 | 100 | 100 | 100 | 100 |
| | 9 | 10 | 11 | 12 | 13 | 14 | 15 | 16 |
| Wt. % | | | | | | | | |
| $SiO_2$ | 43.9 | 38.4 | 40.6 | 37.9 | 37.2 | 45 | 37.6 | 41.6 |
| $Al_2O_3$ | 23.7 | 26.9 | 23 | 26.5 | 26 | 27.2 | 27.4 | 29.1 |
| $Na_2O$ | 22.7 | 19.9 | 21.4 | 17.2 | 13.2 | 12.3 | 11.4 | 9.7 |
| $Li_2O$ | 0 | 0 | 0 | 0 | 0 | 3.5 | 0 | 6.1 |
| $K_2O$ | 2 | 8.2 | 6.2 | 11.9 | 17.2 | 5.7 | 8 | 4.3 |
| $P_2O_5$ | 7.7 | 6.6 | 8.8 | 6.5 | 6.4 | 6.3 | 6 | 6.3 |
| $B_2O_3$ | 0 | 0 | 0 | 0 | 0 | 0 | 0 | 0 |
| BaO | 0 | 0 | 0 | 0 | 0 | 0 | | |
| $Y_2O_3$ | 0 | 0 | 0 | 0 | 0 | 0 | 9.6 | 0 |
| $ZrO_2$ | 0 | 0 | 0 | 0 | 0 | 0 | 0 | 2.9 |
| Total | 100 | 100 | 100 | 100 | 100 | 100 | 100 | 100 |

TABLE 1-continued

Composition of precursor glasses 1-16.

| Mol % | | | | | | | | |
|---|---|---|---|---|---|---|---|---|
| SiO$_2$ | 52 | 47.1 | 49.2 | 47.1 | 47.1 | 52.1 | 50.2 | 47.7 |
| Al$_2$O$_3$ | 16.6 | 19.4 | 16.4 | 19.4 | 19.4 | 18.6 | 21.5 | 19.7 |
| Na$_2$O | 26 | 23.7 | 25.1 | 20.7 | 16.2 | 13.8 | 14.7 | 10.7 |
| Li$_2$O | 0 | 0 | 0 | 0 | 0 | 8.2 | 0 | 14.1 |
| K$_2$O | 1.5 | 6.4 | 4.8 | 9.4 | 13.9 | 4.2 | 6.8 | 3.1 |
| P$_2$O$_5$ | 3.9 | 3.4 | 4.5 | 3.4 | 3.4 | 3.1 | 3.4 | 3.1 |
| B$_2$O$_3$ | 0 | 0 | 0 | 0 | 0 | 0 | 0 | 0 |
| BaO | 0 | 0 | 0 | 0 | 0 | 0 | 0 | 0 |
| Y$_2$O$_3$ | 0 | 0 | 0 | 0 | 0 | 0 | 3.4 | 0 |
| ZrO$_2$ | 0 | 0 | 0 | 0 | 0 | 0 | 0 | 1.6 |
| Total | 100 | 100 | 100 | 100 | 100 | 100 | 100 | 100 |

TABLE 2

Temperature-temporal cycles and appearance after select cycles for precursor glasses 1-16

| | 1 | 2 | 3 | 4 | 5 | 6 | 7 | 8 |
|---|---|---|---|---|---|---|---|---|
| | | | | Heat Treatment at T for 4 hrs | | | | |
| T = 775° C. | Translucent | Translucent | Transparent | Transparent | Transparent | Transparent | Transparent | Opal |
| T = 750° C. | Transparent | Transparent | Transparent | Transparent and cracked | Transparent | Transparent but cracked | Transparent | Hazy |
| T = 825° C. | — | — | — | — | Transparent | Transparent | Transparent | — |
| T = 900° C. | — | — | — | — | — | — | — | — |
| T = 725° C. | — | — | — | — | — | — | — | Transparent |
| | | | | Crystalline phases/assemblages | | | | |
| | Ne Major; NaP Minor | Ne Major Na, BaP Minor | Ne Major NaP Minor | Ne Major NaP Minor | Ne Major NaP Minor | Ne Major NaP Minor | Ne Major NaP Minor | Ne Major NaP Minor |
| | | | | Heat Treatment at T for 4 hrs | | | | |
| T = 775° C. | Hazy | Transparent | Transparent | Transparent | Transparent | Transparent* | — | Transparent |
| T = 750° C. | Transparent | Transparent | Transparent | Transparent | Transparent | — | — | Transparent |
| T = 825° C. | — | Transparent | — | — | — | Transparent | — | — |
| T = 900° C. | — | — | — | — | — | — | Transparent | — |
| T = 725° C. | — | — | — | — | — | — | — | — |
| | | | | Crystalline phases/assemblages | | | | |
| | Ne Major NaP Minor | Ne Major NaP Minor | Ne Major NaP Minor | Ne Major NaP Minor | Ne Major Ks Minor NaP minor | Ne Major LiP Minor | BYP | Ne Major NaP Minor LAS Minor |

Ne = nepheline;
NaP = Na$_3$PO$_4$;
Na, BaP = NaBaPO$_4$;
LiP = Li$_3$PO$_4$ (lithiophosphate);
Ks = KAlSiO$_4$;
YP = YPO$_4$;
LAS = gamma (γ) LiAlSiO$_4$
*Ex. 14—after being cerammed, at 775° C. for 4 hours, and then ion exchanged in a molten salt bath of KNO3 at 480 C. for 8 Hours exhibited an average MOR of about 2540 MPa.

Figure 1:
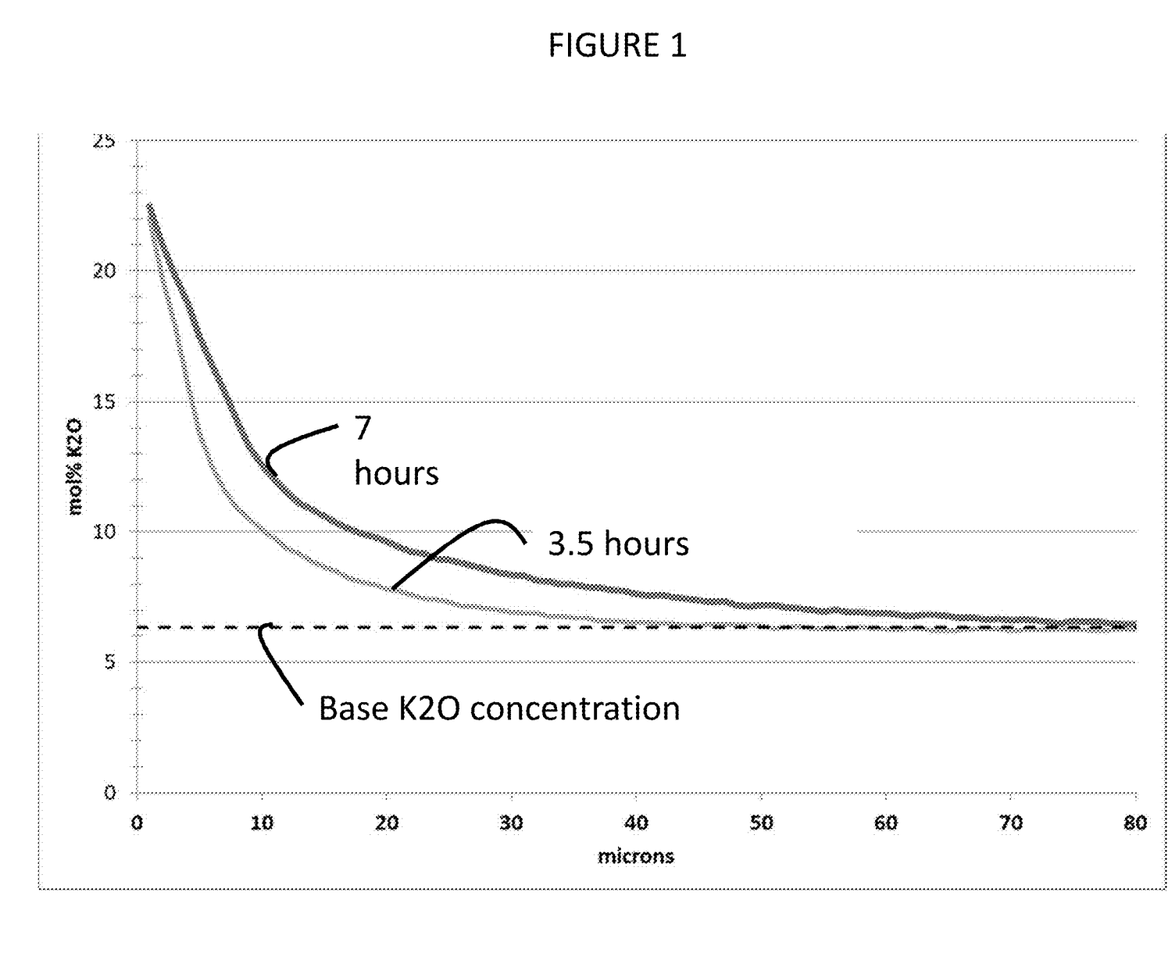
FIG. 1 is a graph showing the concentration of $K_2O$ as a function of depth within a glass-ceramic formed from the precursor glass of Example 5, before and after ion exchanging, as measured by EMPA.

The precursor glass of Example 5 and glass-ceramics formed therefrom were evaluated further. Specifically, the profile of K$_2$O concentration (mol %) as a function of depth, of glass ceramics formed from the precursor glass of Example 5 (after heat treating at T=775° C. for 4 hours), before and after ion exchanging in a molten bath of 100% KNO$_3$ having a temperature of 450° C. for two different time periods: 3.5 hours ("Sample 5A") and 7 hours ("Sample 5B"). The K$_2$O concentrations for the glass-ceramics were measured by EMPA and plotted in FIG. 1. In FIG. 1, the dashed line indicates the amount of K$_2$O in the glass-ceramic prior to being ion exchanged. As shown in FIG. 1, the glass-ceramic that was subjected to a longer ion exchange had a greater concentration of K$_2$O along a greater depth (e.g., K$_2$O concentration at a 18 micron depth for the sample ion exchanged for 7 hours was about twice as much as the K$_2$O concentration at the same depth of the sample ion exchanged for 3.5 hours). As also shown in FIG. 1, the profiles of K$_2$O concentration were not error function-like, as found with the precursor glasses after being ion exchanged similarly. A discontinuity in the slope of the K$_2$O concentration was found at about 8 microns and 13 microns for both samples ion exchanged for 3.5 hours and for 7 hours. A surface XRD analysis indicated the presence of kalsilite (as a layer) at the surface of the glass-ceramic articles, which is believed to be a conversion of nepheline to kalsilite. As discussed herein, this conversion of a portion of the nepheline phase to kalsilite provides substantial strength increase (in terms of increased compressive stress).

Figure 2:
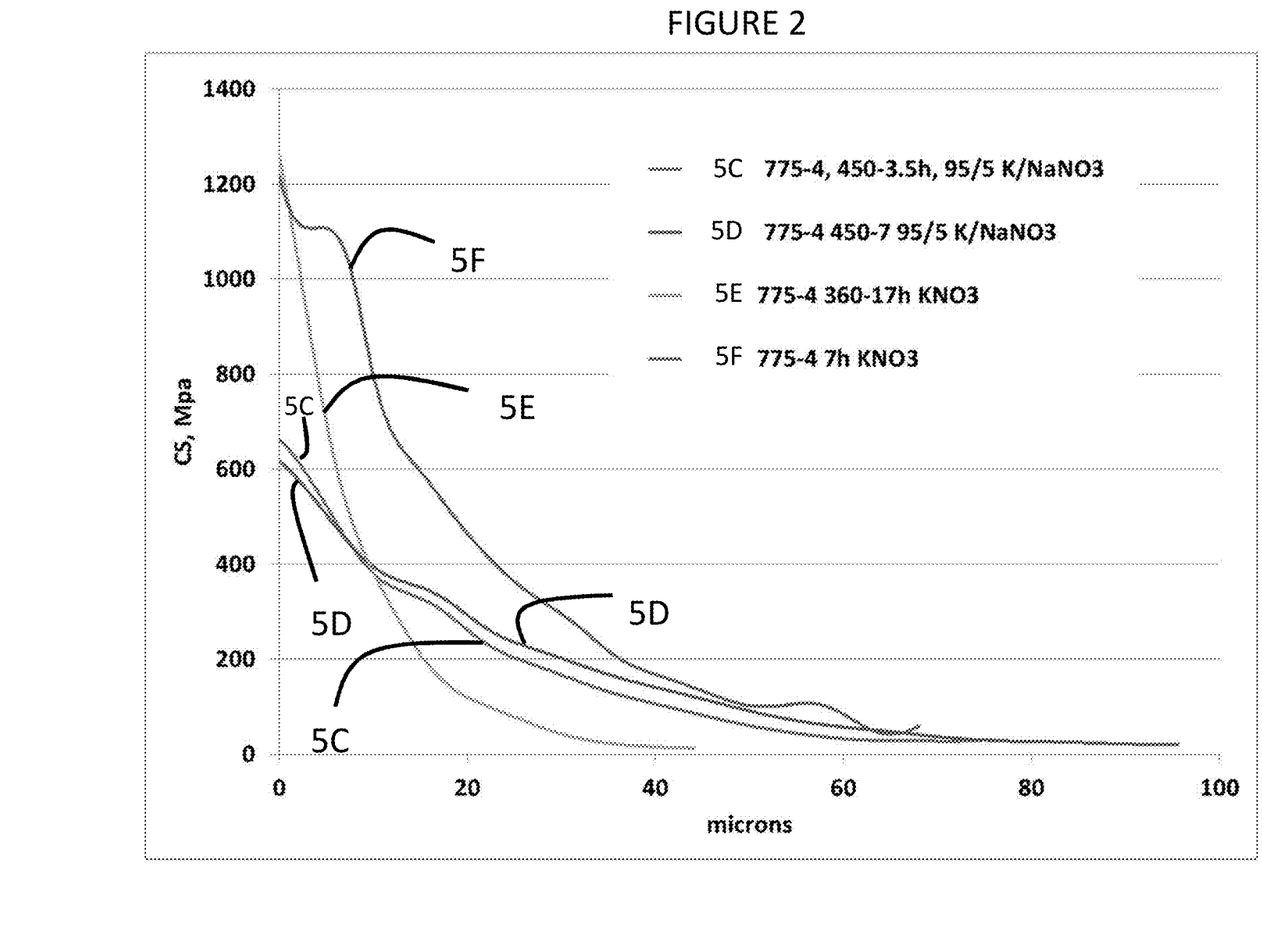
FIG. 2 is a graph showing the compressive stress profiles as a function of depth of glass-ceramics formed from the precursor glass of Example 5, after being ion exchanged.

As the chemical profile was non-standard (e.g., the K$_2$O concentration had discontinuities), compressive stress curves were extracted based on that data. The compressive stress profiles, as a function of DOL, for four samples ("Samples 5C-5F") made from the precursor glass of Example 5 were measured using FSM, and shown in FIG. 2. The four samples were formed using the same heat treatment schedule as the samples shown in FIG. 1 (i.e., heat treated at 775° C. for 4 hours), and had a thickness of 1 mm. The four samples were ion exchanged under different conditions, as shown in Table 3.

TABLE 3

Ion Exchange conditions for glass ceramics 5C-5F.

| Sample | Bath Concentration | Bath Temperature | Ion Exchange Time |
|---|---|---|---|
| 5C | 95 wt % KNO$_3$ 5 wt % NaNO$_3$ | 450° C. | 3.5 hours |

TABLE 3-continued

Ion Exchange conditions for glass ceramics 5C-5F.

| Sample | Bath Concentration | Bath Temperature | Ion Exchange Time |
|---|---|---|---|
| 5D | 95 wt % KNO$_3$ 5 wt % NaNO$_3$ | 450° C. | 7 hours |
| 5E-1 | 100 wt % KNO$_3$ | 360° C. | 2.5 hours |
| 5E-2 | 100 wt % KNO$_3$ | 360° C. | 7 hours |
| 5E-3 | 100 wt % KNO$_3$ | 360° C. | 17 hours |
| 5F | 100 wt % KNO$_3$ | 450° C. | 7 hours |

Sample 5F, which was ion exchanged for 7 hours in a molten bath of 100% KNO$_3$ having a temperature of 450° C. exhibited a surface compressive stress of about 1200 MPa, with a non-monotonic compressive stress profile extending to a DOL that was greater than about 60 um. The precursor glass of Example 5 was ion exchanged under the same conditions as Sample 5F and exhibited a surface CS of about 400 MPa and a DOL that was greater than about 100 μm. A molten bath comprised of 95 wt % KNO$_3$/5 wt % NaNO$_3$ was also used to ion exchange Samples 5C and 5D, which exhibited surface compressive stresses greater than about 600 MPa and a DOL of about 60 um were found. Sample 5E was ion exchanged at a lower temperature (e.g., about 360° C.) for 2.5 hours ("Sample 5E-1"), 7 hours ("Sample 5E-2") and 17 hours ("Sample 5E-3"). The compressive stress profiles for Samples 5E-1 and 5E-2 are not shown in FIG. 2; however a surface compressive stress of about 1200 MPa and a DOL of about 40 μm was observed in Sample 5E-3 after ion exchange for 17 hours at 360° C.

Figure 3:
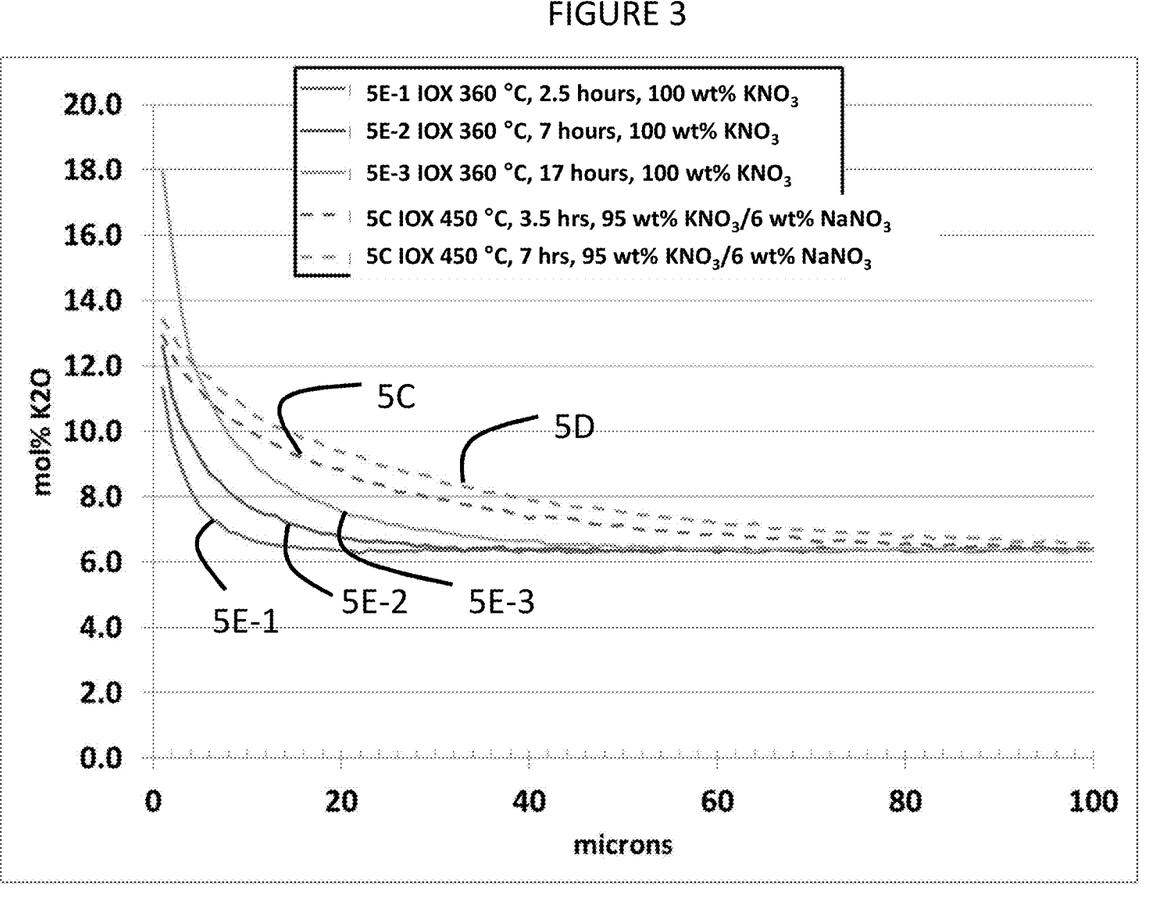
FIG. 3 is a graph showing $K_2O$ concentration as a function of depth of the glass-ceramics formed from the precursor glass of Example 5.

The profiles of K$_2$O concentration (mol %) as a function of depth, as measured by EMPA of Samples 5E-1, 5E-2 and 5E-3 after being ion exchanged at 360° C. for 2.5 hours, 7 hours and 17 hours, respectively, are shown in FIG. 3. The K$_2$O concentration (mol %) profiles as a function of depth of Samples 5C and 5D are also shown in FIG. 3.

Figure 4A:
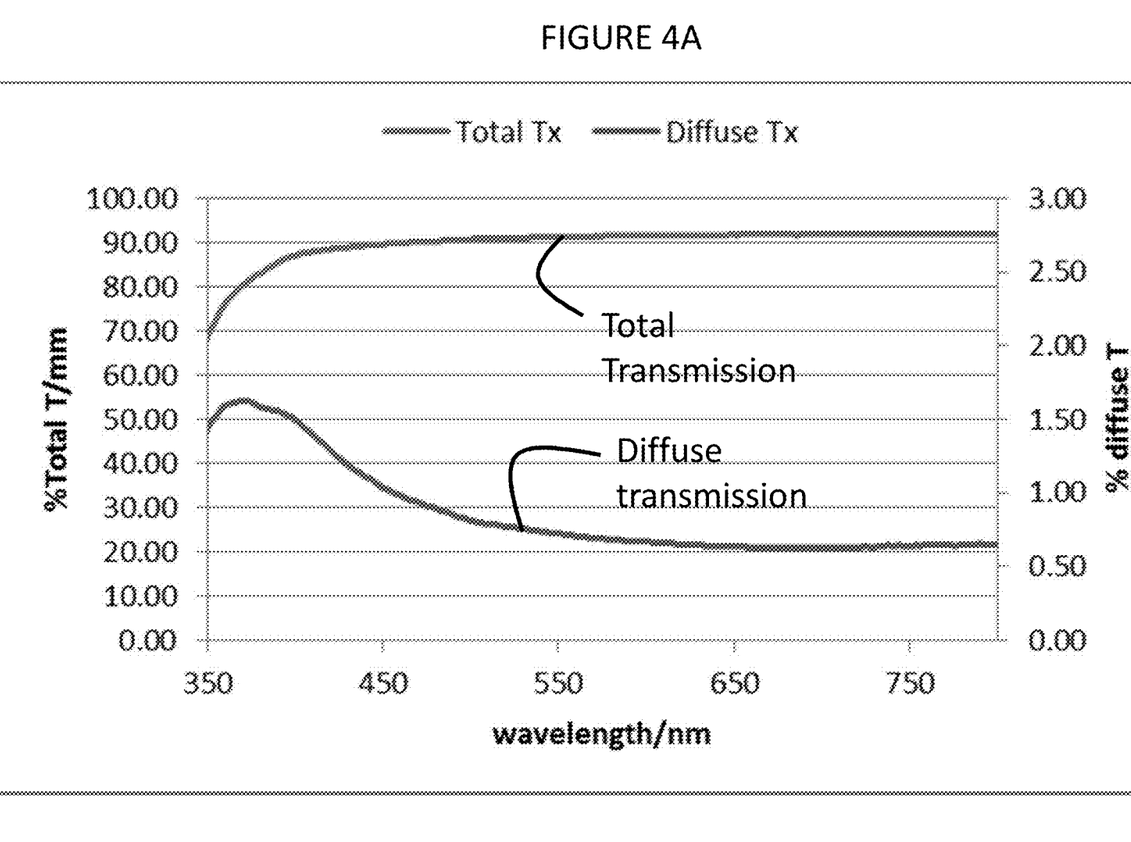
FIG. 4A is a graph showing the total transmission and diffuse transmission of a glass-ceramic formed from the precursor glass of Example 5, prior to being ion exchanged.
Figure 4B:
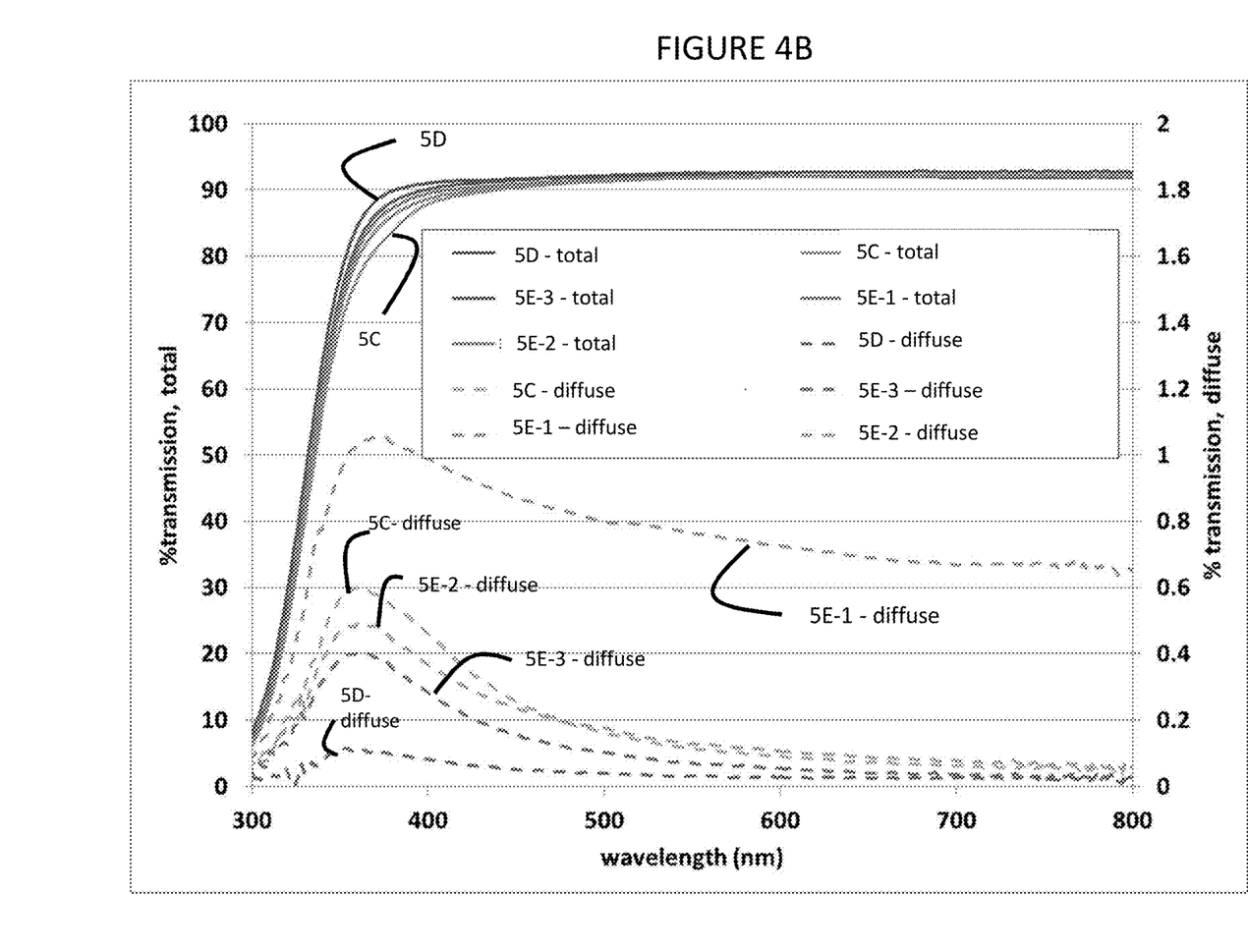
FIG. 4B is a graph showing the total transmission and diffusion transmission of the glass-ceramic shown in FIG. 4B after being ion exchanged.

The total and diffuse transmission for Samples 5C-5E was analyzed and is shown in FIGS. 4A (before ion exchange) and 4B (after ion exchange under the conditions shown in Table 3). The glass-ceramics had a thickness of 1 mm. As shown in FIGS. 4A and 4B, transparency is maintained after ion exchanging.

Diffuse transmission provides an estimate of haze. As shown in FIG. 4A, diffuse transmission is low at wavelengths greater than about 450 nm. Total transmission before ion exchange is greater than about 85% across the visible spectrum and between about 92% and 95% at wavelengths greater than about 550 nm.

In FIG. 4B, the solid lines indicate total transmission and the dashed lines indicate diffuse transmission after the ion exchange conditions shown in Table 3. The total transmission after ion exchange improved over the total transmission of the samples before ion exchange. The diffuse transmission varied, with Sample 5D exhibiting the lowest diffuse transmission, indicating a very low level of haze.

Figure 5:
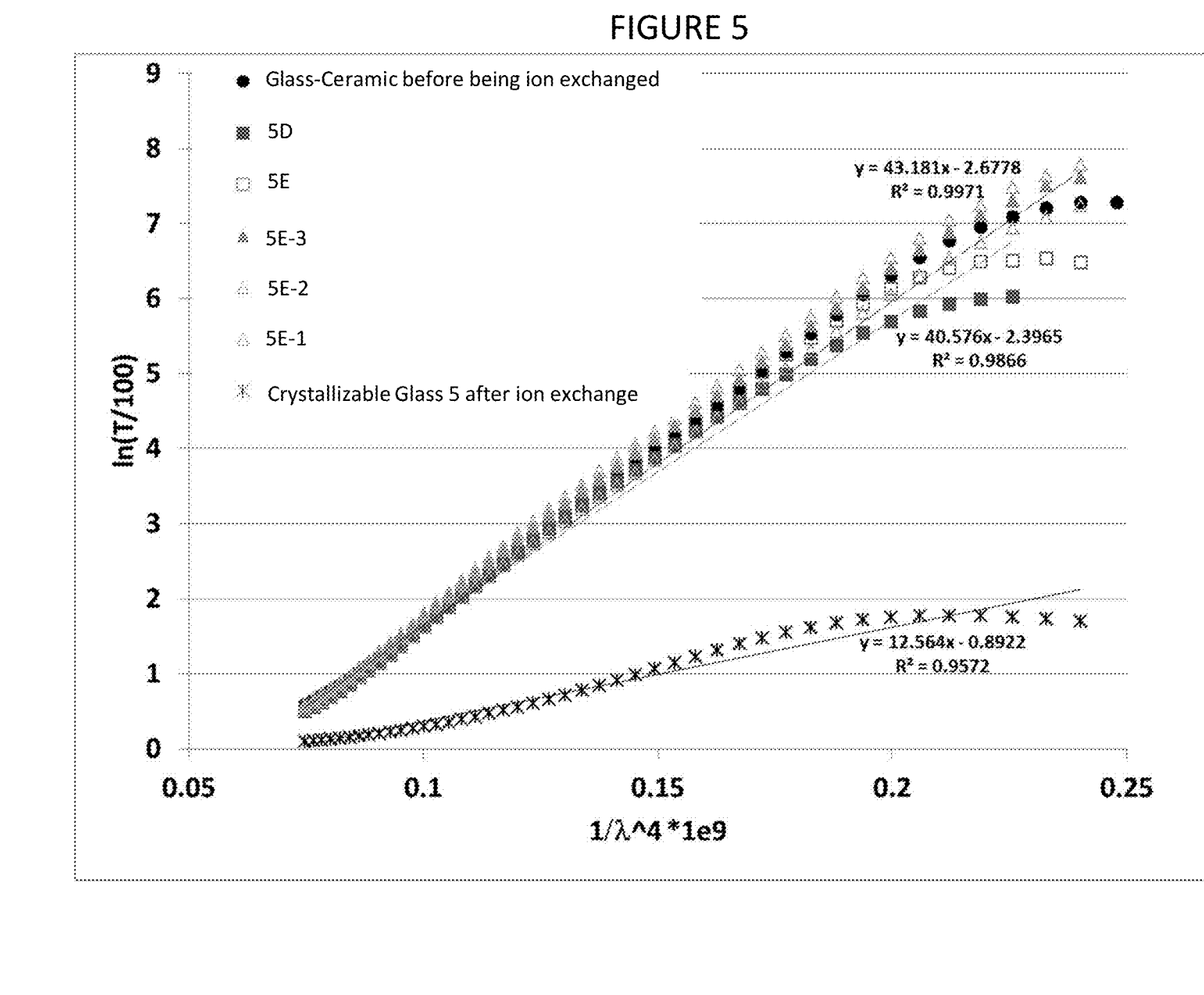
FIG. 5 is a graph showing the $\ln(T_{total})/1$ mm thickness as a function of $1/\lambda^4$ for the precursor glass of Example 5 after being ion exchanged and glass-ceramics formed therefrom before and after being ion exchanged.

FIG. 5 represents ln(T)/1 mm thickness as a function of $1/\lambda^4$ for Samples 5D-5E before ion exchanging and after ion exchanging at different conditions as shown in Table 3. The data for the glass ceramics was compared to the precursor glass of Example 5, after being ion exchanged using the same conditions used to ion exchange Sample 5D. The data shown in FIG. 5 are well fit to a straight line, suggesting that Rayleigh scattering is the dominant loss mechanism. Scatter of the glass ceramics is 3-4 times higher than the precursor glass; this is consistent with the finding of crystals having a major dimension of about 30 nm. Based on FIG. 5, the amount of scatter is not dependent on ion-exchange conditions.

Examples 17-25

The exemplary precursor glasses listed in Table 4 were made in a platinum crucible using a batch of raw materials formulated to yield 2000 g of precursor glass upon melting and refining. Each crucible containing a formulated raw materials batch was placed in a furnace preheated to a temperature in the range from about 1450° C. to about 1650° C., the formulated raw materials batch melted and refined in this furnace for 16 hours to produce molten precursor glass that was then cast into rectangular slabs that were annealed for about 6 hours at a temperature in the range from about 600° C. to about 700° C.

The individual slabs were subject to a number of different and/or similar heat treatments to form glass-ceramics by placing the slaps in a static furnace programmed with such different or similar temperature-temporal cycle. The temperature-temporal cycles to which a number of the slabs of the exemplary precursor glasses listed in Table 4 were subjected are shown in Table 5.

The resulting glass-ceramics were analyzed by XRD to identify the nucleant present in the glass before crystallization to nepheline ss took place. The nucleants were orthophosphates including Na$_3$PO$_4$, NaCaPO$_4$ (rhenanite), and Li$_3$PO$_4$ (lithiophosphate), as shown in Table 4.

TABLE 4

| Composition of precursor glasses 17-25. | | | | | | | | | |
|---|---|---|---|---|---|---|---|---|---|
| Mol % | 17 | 18 | 19 | 20 | 21 | 22 | 23 | 24 | 25 |
| SiO$_2$ | 46.2 | 47.1 | 45.9 | 44.5 | 44.9 | 52.1 | 48.8 | 44.3 | 47 |
| Al$_2$O$_3$ | 19.4 | 19.4 | 19.4 | 18.7 | 19 | 18.6 | 20.1 | 18.2 | 23.5 |
| Na$_2$O | 23.4 | 23.7 | 23.3 | 24.8 | 23 | 13.8 | 7.1 | 22.3 | 17.4 |
| K$_2$O | 6.3 | 6.4 | 6.2 | 7.5 | 6.2 | 4.2 | 2.9 | 6 | 5.6 |
| Li$_2$O | 0 | 0 | 0 | 0 | 0 | 8.2 | 16.5 | 0 | 0 |
| P$_2$O$_5$ | 4.7 | 3.4 | 5.2 | 4.5 | 4.3 | 3.1 | 3.2 | 3.2 | 2.5 |
| CaO | 0 | 0 | 0 | 0 | 0 | 0 | 0 | 0 | 4 |
| B$_2$O$_3$ | 0 | 0 | 0 | 0 | 2.6 | 0 | 0 | 0 | 0 |
| ZrO$_2$ | 0 | 0 | 0 | 0 | 0 | 0 | 1.4 | 6 | 0 |
| Total | 100 | 100 | 100 | 100 | 100 | 100 | 100 | 100 | 100 |
| Nucleant | Na$_3$PO$_4$ | Na$_3$PO$_4$ | Na$_3$PO$_4$ | Na$_3$PO$_4$ | Na$_3$PO$_4$ | Li$_3$PO$_4$ | Li$_3$PO$_4$ | Na$_3$PO$_4$ | NaCaPO$_4$ |

It should be noted that in the compositions of Table 4, the effective ratio of Na/(Na+K), after removing the Na to form the nucleating phosphate (or phosphate nucleant), may be varied in the range from about 0.45 to about 0.9.

TABLE 5

Temperature-temporal cycles for precursor glasses 17-25.

| | 17 | 18 | 19 | 20 | 21 | 22 | 23 | 24 | 25 |
|---|---|---|---|---|---|---|---|---|---|
| Heat Treatment at T for XX hrs | | | | | | | | | |
| T = 775° C. | 4 | 4 | 4 | 4 | | 4 | | | 4 |
| T = 750° C. | | | | | | | 4 | | |
| T = 825° C. | | | | | | | | 4 | |
| T = 900° C. | | | | | | | | | |
| T = 725° C. | | | | | 4 | | | | |
| Crystalline phases/assemblages | | | | | | | | | |
| | Ne + NaP | Ne + NaP | Ne + NaP | Ne + NaP | Ne + NaP | Ne + LiP | Ne + LAS + LiP + lithium disilicate | Ne + NaP + $ZrO_2$ | Ne + Na $CaPO_4$ |

Ne = nepheline;
NaP = $Na_3PO_4$;
Na, BaP = $NaBaPO_4$;
LiP = $Li_3PO_4$ (lithiophosphate);
Ks = $KAlSiO_4$;
YP = $YPO_4$;
LAS = gamma ($\gamma$) $LiAlSiO_4$ The glass ceramic of Example 17 exhibited a compressive stress having a deep depth of layer. The glass ceramic of Example 17 also exhibited low crystallinity (i.e., (R-3P)/Al=0.80).

The glass-ceramic of Example 18 exhibited stoichiometric, high crystallinity and (R-3P)/Al=1.0.

The glass-ceramic of Example 19 exhibited the deepest depth of layer and lowest (R-3P)/Al=0.72.

The glass-ceramic of Example 20 exhibited (stoichiometric (R-3P)/Al=1.0,) and a higher amount of $P_2O_5$ relative to Example 18 (which also exhibited R-3P)/Al=1.0).

The glass-ceramic of Example 21 included $B_2O_3$ and is believed to exhibit increased indentation fracture resistance.

The precursor glass of Example 22 exhibited low liquidus viscosity (at 1050° C.) and the resulting glass-ceramic exhibited an unabraded MOR of greater than about 3 GPa.

The glass-ceramic of Example 23 exhibited nepheline+$\gamma$-eucryptite crystal phases. Without being bound by theory, it is believed that Example 23 would exhibit a lower coefficient of thermal expansion (CTE).

The glass-ceramic of Example 25 is believed to exhibit increased chemical durability due to the presence of $NaCaPO_4$ than Examples including NaP.

It will be apparent to those skilled in the art that various modifications and variations can be made without departing from the spirit or scope of the invention.

What is claimed is:

1. A method of forming a glass-ceramic article, comprising:
   heat treating a precursor glass article by heating the precursor glass article at a rate in the range from about 1° C./minute to about 10° C./minute to a crystallization temperature (Tc) in the range from about 600° to about 1000° C.;
   maintaining the precursor glass article at the Tc to produce a glass-ceramic article having a nepheline crystalline phase and a phosphate phase; and
   cooling the glass-ceramic article to about room temperature.

2. The method of claim 1, further comprising heating the precursor glass article to a nucleating temperature (Tn) in the range from about 700° C. to about 900° C., and maintaining the precursor glass article at the Tn to produce a nucleated precursor glass article prior to maintaining the precursor glass article at the Tc.

3. The method of claim 2, further comprising heating the nucleated precursor glass article at a rate in the range from about 1° C./minute to about 10° C./minute to the Tc.

4. The method of claim 1, further comprising ion exchanging the glass-ceramic article.

5. The method of claim 4, wherein the ion exchanging generates a compressive stress layer comprising a compressive stress of at least 400 MPa.

6. The method of claim 4, wherein the ion exchanging generates a kalsilite surface layer.

7. The method of claim 4, wherein the ion exchanging generates a depth of layer in the range from about 50 μm to about 150 μm.

8. The method of claim 1, wherein the precursor glass article has a composition, in mol %, comprising:
   $SiO_2$ in the range from about 35% to about 60%,
   $Al_2O_3$ in the range from about 10% to about 30%,
   $Na_2O$ in the range from about 7% to about 31%,
   $K_2O$ in the range from 0% to about 20%,
   $Li_2O$ in the range from 0% to about 20%,
   $P_2O_5$ in the range from about 1.5% to about 8%, and
   a rare earth oxide in the range from 0% to about 6%.

9. The method of claim 8, wherein the precursor glass article composition further comprises at least one oxide in an amount in the range from 0 mol % to about 8 mol %, wherein the at least one oxide comprises one of $B_2O_3$, MgO, CaO, SrO, BaO, and $ZrO_2$.

10. The method of claim 8, wherein the precursor glass article composition further comprises, in mol %:
    $SiO_2$ in the range from about 40% to about 55%,
    $Al_2O_3$ in the range from about 14% to about 21%,
    $Na_2O$ in the range from about 13% to about 29%,
    $K_2O$ in the range from about 2% to about 14%,
    $Li_2O$ in the range from 0% to about 10%,
    $P_2O_5$ in the range from about 2.5% to about 5%, and
    at least one of $ZrO_2$, $Y_2O_3$ and $La_2O_3$ in an amount in the range from 0% to about 4%,
    wherein the composition comprises less than about 1% $TiO_2$.

11. The method of claim 1, wherein the precursor glass article is a glass sheet having a thickness of less than about 5 mm.

12. The method of claim 1, wherein the glass-ceramic article is colorless and has transmission or reflection color coordinates under the CIE L*, a*, b* colorimetry system of L* in the range from about 80 to about 100, a* in the range from about −5 to about 5, and b* in the range from about b* in the range from about −5 to about 5, and exhibits a transmittance of about 70% or greater across the visible spectrum, in the range from about 390 nm to about 700 nm.

13. The method of claim 1, wherein the glass-ceramic article further comprises a lithium aluminosilicate phase.

* * * * *